(12) United States Patent
Færevaag

(10) Patent No.: US 8,456,228 B2
(45) Date of Patent: Jun. 4, 2013

(54) LOW POWER REFERENCE

(75) Inventor: Erik Fossum Færevaag, Bergen (NO)

(73) Assignee: Energy Micro AS, Oslo (NO)

( * ) Notice: Subject to any disclaimer, the term of this patent is extended or adjusted under 35 U.S.C. 154(b) by 0 days.

(21) Appl. No.: 13/501,495

(22) PCT Filed: Oct. 14, 2010

(86) PCT No.: PCT/IB2010/002837
§ 371 (c)(1),
(2), (4) Date: Apr. 12, 2012

(87) PCT Pub. No.: WO2011/045676
PCT Pub. Date: Apr. 21, 2011

(65) Prior Publication Data
US 2012/0200344 A1    Aug. 9, 2012

Related U.S. Application Data

(60) Provisional application No. 61/251,613, filed on Oct. 14, 2009.

(51) Int. Cl.
*G05F 1/10* (2006.01)

(52) U.S. Cl.
USPC ......................................................... 327/544

(58) Field of Classification Search
USPC .......................... 327/530, 534–541, 543–546
See application file for complete search history.

(56) References Cited

U.S. PATENT DOCUMENTS

| 6,285,231 | B1 | 9/2001 | Opris et al. | |
| 6,333,939 | B1 | 12/2001 | Butler et al. | |
| 6,535,051 | B2 * | 3/2003 | Kim | 327/536 |
| 2002/0130710 | A1 | 9/2002 | Mahrla | |
| 2004/0251957 | A1 * | 12/2004 | Do | 327/541 |
| 2009/0237057 | A1 | 9/2009 | Dishman et al. | |

FOREIGN PATENT DOCUMENTS

WO    WO 2006/078850 A2    7/2006

OTHER PUBLICATIONS

International Search Report for related international application No. PCT/IB2010/002837, report dated May 24, 2011.
Chueh H-T, et al. "A Real-Time Data Acquisition System for a Hand-Held Electronic Nose (H<2>EN)", Sensors and Actuators B, Elsevier Sequoia S.A., Lausanne, CH, vol. 83, No. 1-3, Mar. 15, 2002, pp. 262-269, XP004344515, ISSN: 0925-4005, DOI: 10.1016/S0925-4005(01)01059-0.

* cited by examiner

*Primary Examiner* — Lincoln Donovan
*Assistant Examiner* — Sibin Chen
(74) *Attorney, Agent, or Firm* — Miller, Matthias & Hull LLP

(57) ABSTRACT

A low power reference device is disclosed. The low power reference device includes a precision reference module, a low power reference module, a calibration module, an output module and one or more sequencers. The precision reference module is configured to output a first reference signal while the low power reference module is configured to output a second reference signal. The calibration module is configured to receive the first and second reference signals and output a correction signal to the low power reference module. The output module is configured to receive the first and second reference signals and output a final reference signal. The one or more sequencers are configured to drive each of the precision reference modules, low power reference module, calibration module and output module according to a predetermined timing sequence.

21 Claims, 8 Drawing Sheets

LOW POWER REFERENCE

CROSS-REFERENCE TO RELATED APPLICATION

This application is a 35 USC §371 US National Stage patent application of International Patent Application No. PCT/IB2010/002837 filed on Oct. 14, 2010, and claims priority to U.S. Provisional Application Ser. No. 61/251,613, filed on Oct. 14, 2009.

BACKGROUND

1. Technical Field

The present disclosure relates to low power electronics, and more particularly, to a low power reference module for electronics that provides a power-save mode and a method for implementing the same.

2. Description of the Related Art

Solid state integrated circuits are commonly used in the art to provide at least some automated operation or control of an electronic device, or the like. Integrated circuits typically include one or more circuits, or digital and/or analog modules, that are interconnected to perform the operations. Such integrated circuits generally include a power source such as a battery cell, or the like, and a reference circuit or module such as a regulator, or the like, to regulate the voltage and/or current from the power source for delivery to the individual components or modules of the integrated circuit. More specifically, the reference module stabilizes voltage and/or current signals generated by the power source, and further, outputs voltage and/or current reference signals to the individual circuit components or modules of the integrated circuit.

A conventional integrated reference module may employ a single circuit to generate a precise reference voltage or current. This reference signal may be applied locally within a particular module and serve as a local bias module, or alternatively, may be exported to other modules and serve as a global bias module. Typical reference modules may incorporate means for generating voltage and/or current reference signals that are always on and always consuming power while the particular device is powered on. In portable devices, this may translate to a considerable amount of battery power drained. When the power sources of such devices are depleted, they are either replaced with a new battery cell or recharged. Disposing of used batteries as well as manufacturing new batteries to replace depleted batteries consume considerable resources and can raise environmental issues. Frequent recharging of batteries also consumes energy. As the world becomes increasingly more conscious of environmental issues, there are increased efforts to optimize the energy density of battery cells and/or minimize the power consumption of the device to be powered by a battery cell. However, as developments in the field of batteries saturate, there is an even greater demand for energy efficient and low power devices, or "green" devices.

Therefore, there is a need for improved electronic devices that can provide uncompromised performance while consuming substantially less power so as to provide significantly longer life per battery used. Moreover, there is a need for a low power reference module design or method that can provide a stable reference voltage and/or current signal that is substantially unaffected by temperature and supply voltages fluctuations. Furthermore, there is a need for a low power electronic device capable of operating in a power-save mode of operation, wherein non-vital modules or subcomponents may be disengaged or operated autonomously for a majority of the overall system operation.

SUMMARY OF THE DISCLOSURE

In satisfaction of the aforenoted needs, a low power reference device capable of generating stable reference signals is disclosed.

A low power reference device is disclosed. The low power reference device includes one or more precision reference modules, one or more low power reference modules, one or more calibration modules, one or more output modules and one or more sequencers. The precision reference module is configured to output a first reference signal. The low power reference module is configured to output a second reference signal approximating the first reference signal. The calibration module is configured to receive the first and second reference signals and output a correction signal to the low power reference module. The output module is configured to receive the first and second reference signals and output a final reference signal. The one or more sequencers are configured to operate the precision reference module, low power reference module, calibration module and output module.

In a refinement, the one or more sequencers are configured to operate the precision reference module, low power reference module, calibration module and output module according to a predetermined timing sequence.

In another refinement, the precision reference module includes a bandgap cell.

In another refinement, the low power reference module includes a transconductance cell.

In another refinement, the low power reference module is configured to adjust the second reference signal according to the correction signal to approximate the first reference signal.

In another refinement, the low power reference module is configured to increase or decrease a magnitude of the second reference signal based on the correction signal received.

In another refinement, the calibration module is integrated into the low power reference module.

In another refinement, the calibration module includes a comparator configured to compare magnitudes of the first and second reference signals In another refinement, the output module includes a first switch configured to select between the first and second reference signals, and a second switch configured to select between a sample and hold mode and a track mode.

In another refinement, the predetermined timing sequence is configurable by a user.

In another refinement, the predetermined timing sequence includes one or more selectable modes.

In a related refinement, the modes include at least a default mode and a power-save mode.

In a related refinement, the precision reference module is always on during the default mode.

In a related refinement, the low power reference module is duty-cycled during the power-save mode.

In a related refinement, during the power-save mode, the one or more sequencers are configured to reference a clock signal, designate the clock signal into a plurality of repeating sequences such that each sequence includes a primary cycle that is followed by one or more secondary cycles, enable selection of only the first reference signal at the primary cycle, enable calibration of the second reference signal to approximate the first reference signal at the primary cycle, disable at least the first reference signal during the secondary cycles, and enable selection of only the second reference signal at the secondary cycles.

In a related refinement, the modes include a high accuracy mode and a low accuracy mode.

In another refinement, the one or more sequencers are further configured to output a clock refresh reference signal, the clock refresh reference signal including information related to final reference signal updates.

In yet another refinement, each of the precision reference module, low power reference module, calibration module, output module and one or more sequencers are autonomous.

A method for generating a low power reference signal from a reference device operating in a power-save mode is disclosed. The method comprises the steps of referencing a clock signal, generating a precise reference signal, generating a low power reference signal, calibrating the low power reference signal to approximate the precise reference signal, disabling at least the precise reference signal, and selecting only the low power reference signal to be output from the reference device.

In a refinement, the method further includes the step of designating the clock signal into a plurality of repeating sequences, wherein each sequence has a primary cycle that is followed by one or more secondary cycles. The precise reference signal is generated at the primary cycle and only the precise reference signal is selected to be output from the reference device at the primary cycle. The low power reference signal is generated at the primary cycle, and further, is calibrated at the primary cycle. The precise reference signal is disabled during the secondary cycles. The low power reference signal is selected to be output or update the output at the secondary cycles In yet another refinement, the precise reference signal is generated using a bandgap cell.

Other advantages and features will be apparent from the following detailed description when read in conjunction with the attached drawings.

BRIEF DESCRIPTION OF THE DRAWINGS

The disclosed low power reference scheme is described more or less diagrammatically in the accompanying drawings wherein.

It should be understood that the drawings are not necessarily to scale and that the embodiments are sometimes illustrated by graphic symbols, phantom lines, diagrammatic representations and fragmentary views. In certain instances, details which are not necessary for an understanding of this disclosure or which render other details difficult to perceive may have been omitted. It should be understood, of course, that this disclosure is not limited to the particular embodiments and methods illustrated herein.

DETAILED DESCRIPTION OF THE DISCLOSURE

Figure 1:
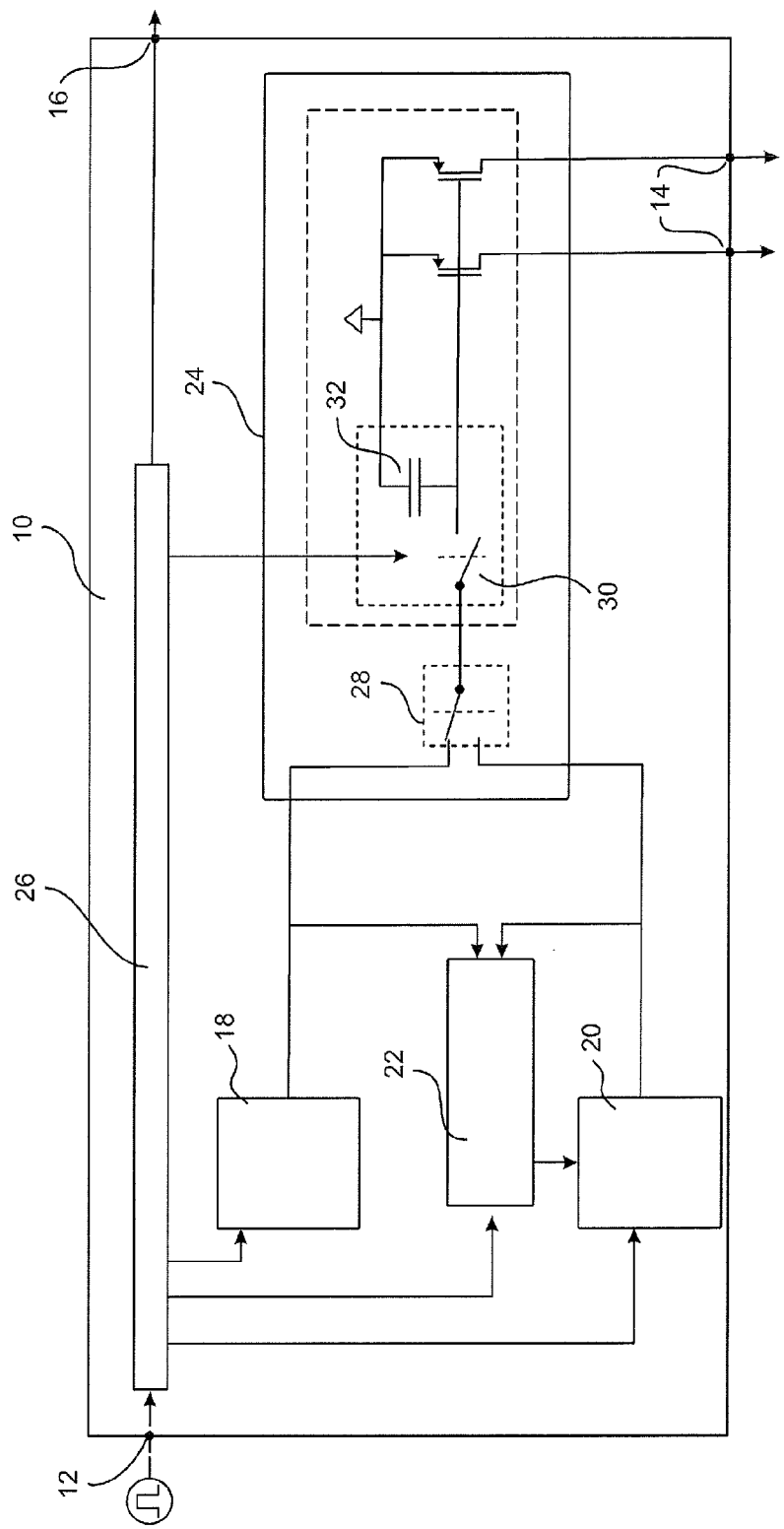
FIG. 1 is a schematic of a low power reference device constructed in accordance with this disclosure.

FIG. 1 illustrates an exemplary low power reference device 10 constructed in accordance with this disclosure. As shown, the low power reference device 10 may include one or more input terminals 12 configured to receive a clock signal, or the like, and one or more output terminals 14, 16 configured to output reference signals, for example, voltage and/or current reference signals, clock refresh reference signals, and the like. Alternatively, the low power reference device 10 may provide an internal clock signal such that the input terminal 12 of FIG. 1 may be omitted. The reference device 10 may additionally include a precision reference module 18, a low power reference module 20, a calibration module 22, an output network or module 24 and a sequencer 26. The precision reference module 18 may be configured to generate a precise and stable first reference signal. The low power reference module 20, in conjunction with the calibration module 22, may generate a second reference signal which approximates the first reference signal. Accordingly, the calibration module 22 may also be disposed within, and integrated into, the low power reference module 20, and/or any other modules. Both of the first and second reference signals may be transmitted to the output module 24, which may be configured to select the reference signal to output and determine the manner in which the selected reference signal is output to output terminals 14 based on the desired mode of operation. The sequencer 26 may be configured to manage the timing and operation of the individual components or modules 18, 20, 22, 24 of the reference device 10.

More specifically, the precision reference module 18 may include a bandgap cell as commonly used in the art, or any other circuit suitable for outputting substantially stable and low power reference signals that are virtually unaffected by temperature variants. The precision reference module 18 may be configured to output a first or precise reference signal to the calibration module 22. The low power reference module 20 may include a transconductance circuit, or any other circuit suitable for low power operations. The calibration module 22 may be associated with the low power reference module 20 such that the second reference signal approximates the first reference signal generated by the precision reference module 18. Moreover, the calibration module 22 may employ a comparator, or the like, to compare the second reference signal to the first reference signal and output a correction signal to the low power reference module 20. Based on the correction signal, the low power reference module 20 may adjust its output to more closely approximate the first reference signal provided by the precision reference module 18. Alternatively, the calibration module 22 may be integrated into the low power reference module 20.

Each of the resulting first and second reference signals may be transmitted to the output module 24 for further processing. In one embodiment, the output module 24 may include a network of switches 28, 30, or the like, configured to sample and/or route one of the first and second reference signals toward the output terminals 14 of the reference device 10. Alternatively, the output module 24 may be configured to permanently receive only the second reference signal, in which case the first switch 28 of FIG. 1 may be omitted. In still alternative embodiments, the sampling and holding means may be provided externally and not within the low power reference device 10. The output module 24 may also include storage devices or capacitors 32 configured to store a value of a sampled reference signal for reference. Moreover, depending on the selected mode of operation, the series of switches 28, 30 and the capacitor 32 may sample one of the first and second reference signals, store or hold the value of the signal, and output the selected signal via the output terminals 14 as needed. For instance, in a low power or power-save mode of operation, the output module 24 may couple the first switch 28 to the output of the low power reference module 20, close the second switch 30 so as to store the value of the second reference signal via the capacitor 32, and output the value as a final reference signal via the output terminals 14 of the reference device 10. The sequencer 26 may be configured to manage the timing of the operations of the switches 28, 30 of the output module 24, as well as the precision reference module 18, low power reference module 20 and calibration module 22, in accordance with a predetermined, predefined and/or preprogrammed timing sequence and a selected mode of operation. The sequencer 26 of FIG. 1 may also be implemented as a plurality of sequencers distributed at the individual modules and configured to manage interactions therebetween.

Figure 2:
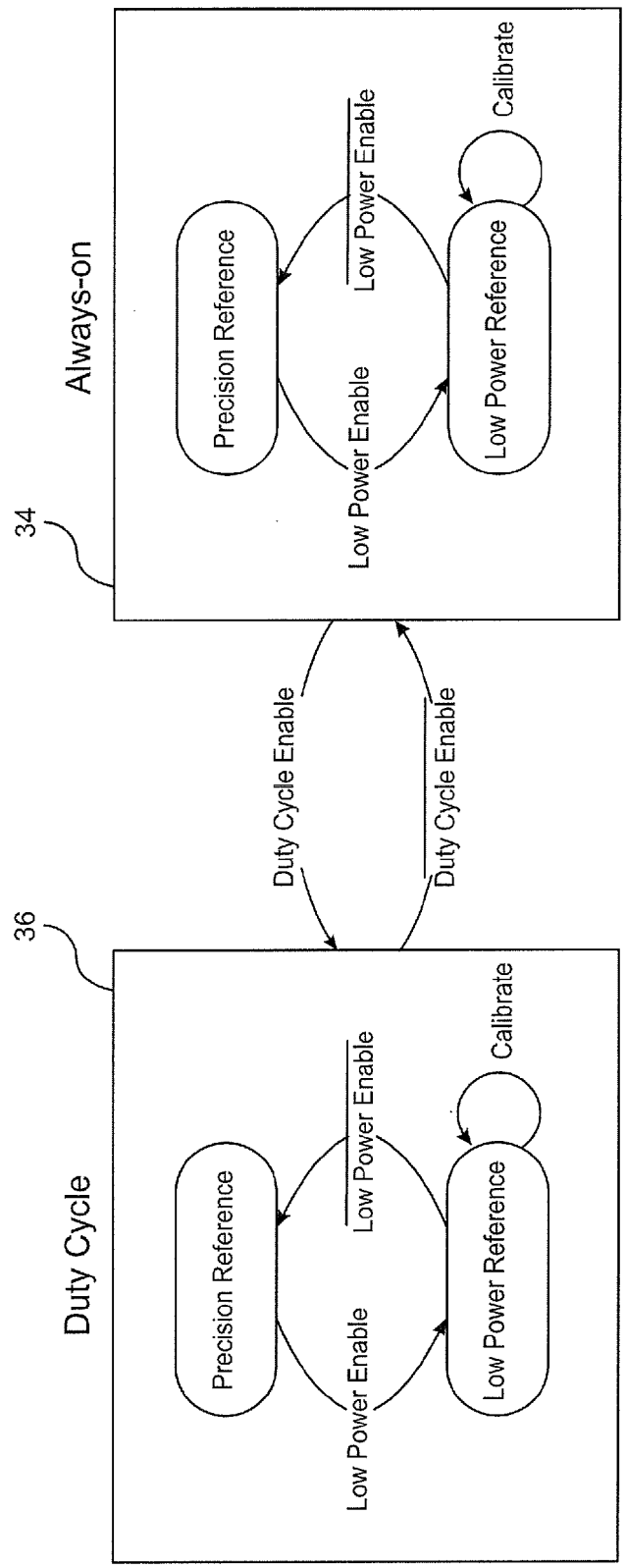
FIG. 2 is a diagram of the available modes of operation of an exemplary low power reference device.

Referring now to FIG. 2, exemplary modes of operation are disclosed. In particular, the sequencer 26 may be configured to manage operations of the reference device 10 between two or more modes based on a predetermined, predefined and/or preprogrammed timing sequence which may be configurable by a user. As shown in FIG. 2, the modes may primarily include a default or always-on mode 34 and a power-save or duty-cycled mode 36. Moreover, the default mode 34 may represent a mode of operation in which all of the components of the reference device 10 are always working or always on to supply reference signals directly from the precision reference module 18. Although power consumption in the default mode 34 may not be minimized, the reference signals provided in the default mode 34 may be more stable and reliable. The power-save mode 36 may represent a mode of operation in which only the low power reference module 20 is duty-cycled or sampled periodically while all other non-vital components are disabled. In related embodiments, the power-save mode 36 may duty-cycle or sample only the precision reference module 18. The reference signals generated during the power-save mode 36 may serve as approximations of the precise reference signals and calibrated to be of comparable quality. Accordingly, functionality is not compromised by the power-save mode 36 while power consumption is considerably reduced.

Figure 3:
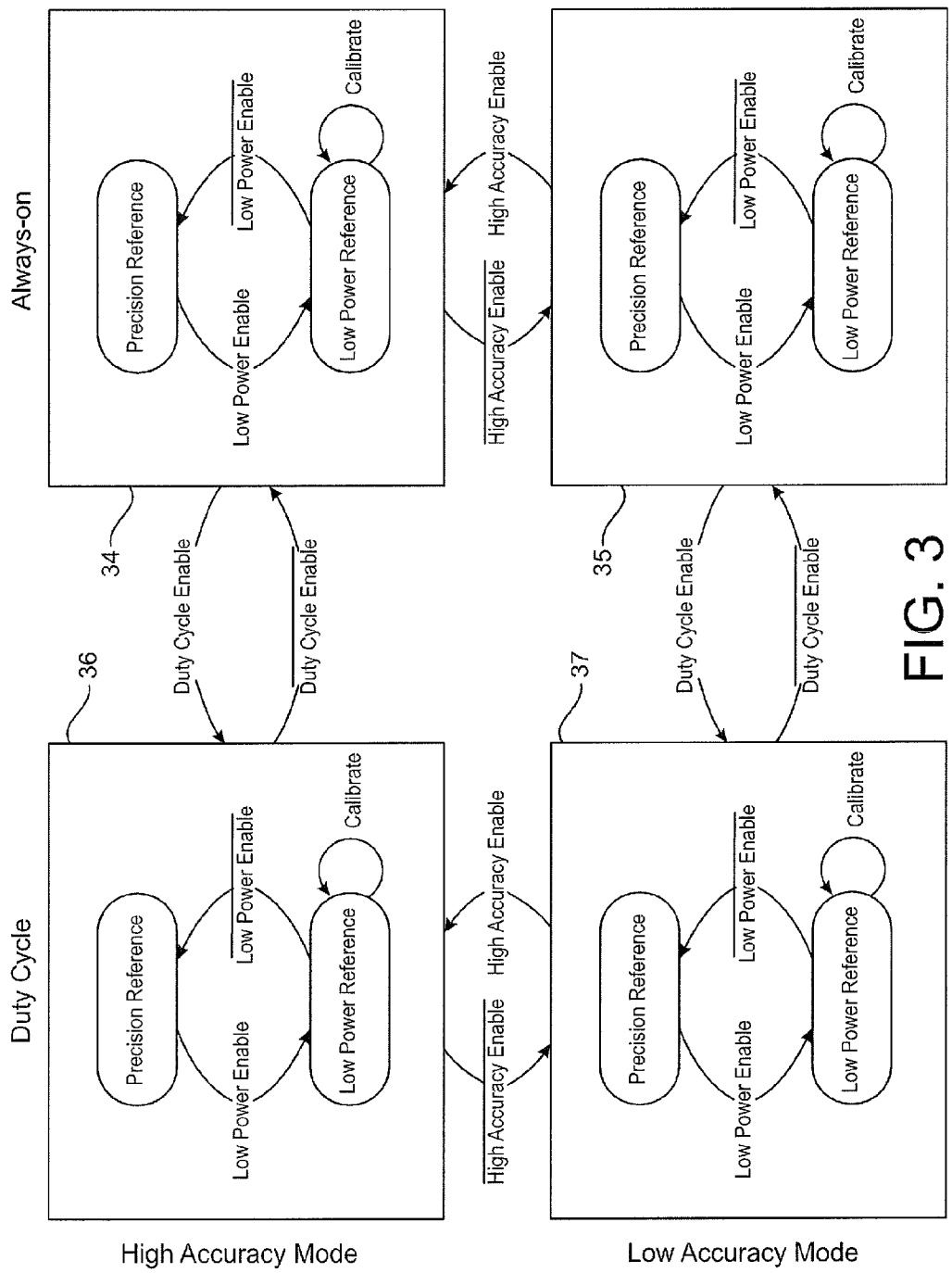
FIG. 3 is another diagram of the available modes of operation of another low power reference device.

Turning to FIG. 3, the sequencer 26 may optionally be configured to further differentiate between other performance characteristics, such as different levels of accuracy, noise, and the like. For instance, each of the default and power-save modes 34, 36 of FIG. 2 may further be distinguishable between any number of contrasting accuracy levels, such as shown by the high accuracy modes 34, 36 and the low accuracy modes 35, 37 of FIG. 3. As previously disclosed, the default modes 34, 35 may generally correspond to a mode of operation in which all of the components of the reference device 10 are always working to supply reference signals directly from the precision reference module 18. Distinguishing factors between the high and low accuracy default modes 34, 35 may pertain to the allotted settling time, the amount of current, the desired circuit configuration, or combinations thereof. Also, as previously disclosed, the power-save modes 36, 37 may correspond to a mode of operation in which only the low power reference module 20 is referenced while all other non-vital components are disabled. The distinguishing factors between the high and low accuracy power-save modes 36, 37 may similarly correspond to the allotted settling time, the amount of current, the desired noise configuration, or combinations thereof. The high accuracy modes 34, 36 may provide the benefits of more reliable signals with less noise and smaller reference ripples while low accuracy modes 35, 37 may provide the benefits of considerably reduced power consumption.

Figure 4A:
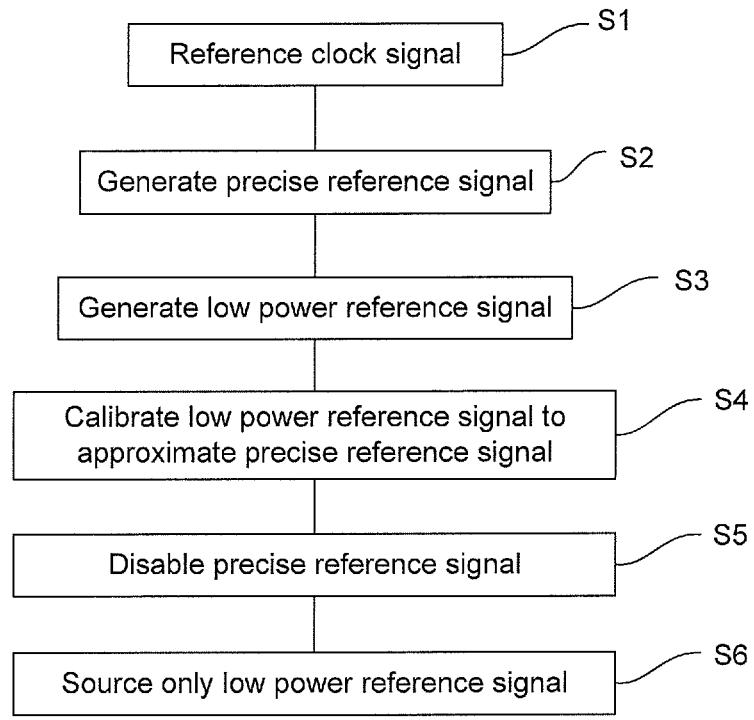
FIG. 4A is a flow diagram of a low power reference device operating in a power-save mode.

Referring now to FIG. 4A, a flow chart of one exemplary method for providing a low power reference signal is disclosed. A low power reference device 10, as shown in FIG. 1 for example, may operate according to the steps S1-S6 shown during a power-save mode 36, or the like. More particularly, in a step S1, an internally or externally generated clock signal may be referenced. In steps S2 and S3, a precise reference signal and a low power reference signal may be generated. Moreover, the low power reference signal may be calibrated to approximate the precise reference signal in a step S4. Once the low power reference signal closely approximates the precise reference signal, the precise reference signal may be disabled in a step S5, while the low power reference signal may be referenced in an optional step S6. In subsequent processes, the low power reference signal may be sourced continuously without additional calibrations. Alternatively, the precise reference signal may be re-enabled for use as a reference or for use with subsequent calibrations, as discussed more specifically below.

Figure 4B:
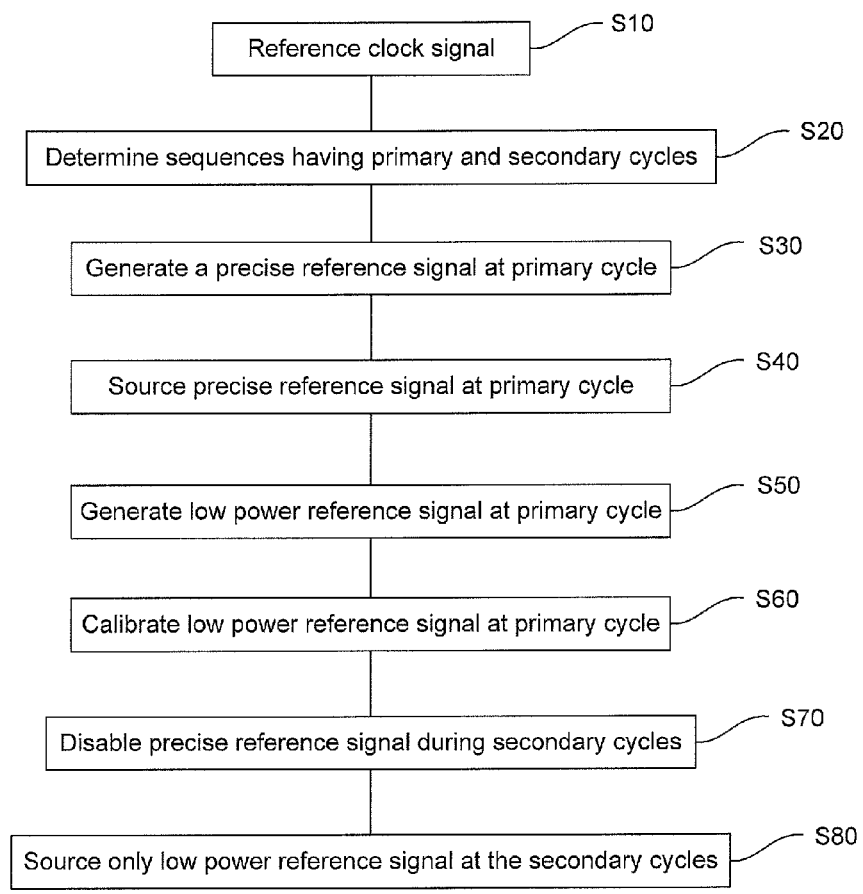
FIG. 4B is another flow diagram of another low power reference device operating in a power-save mode.
Figure 4C:
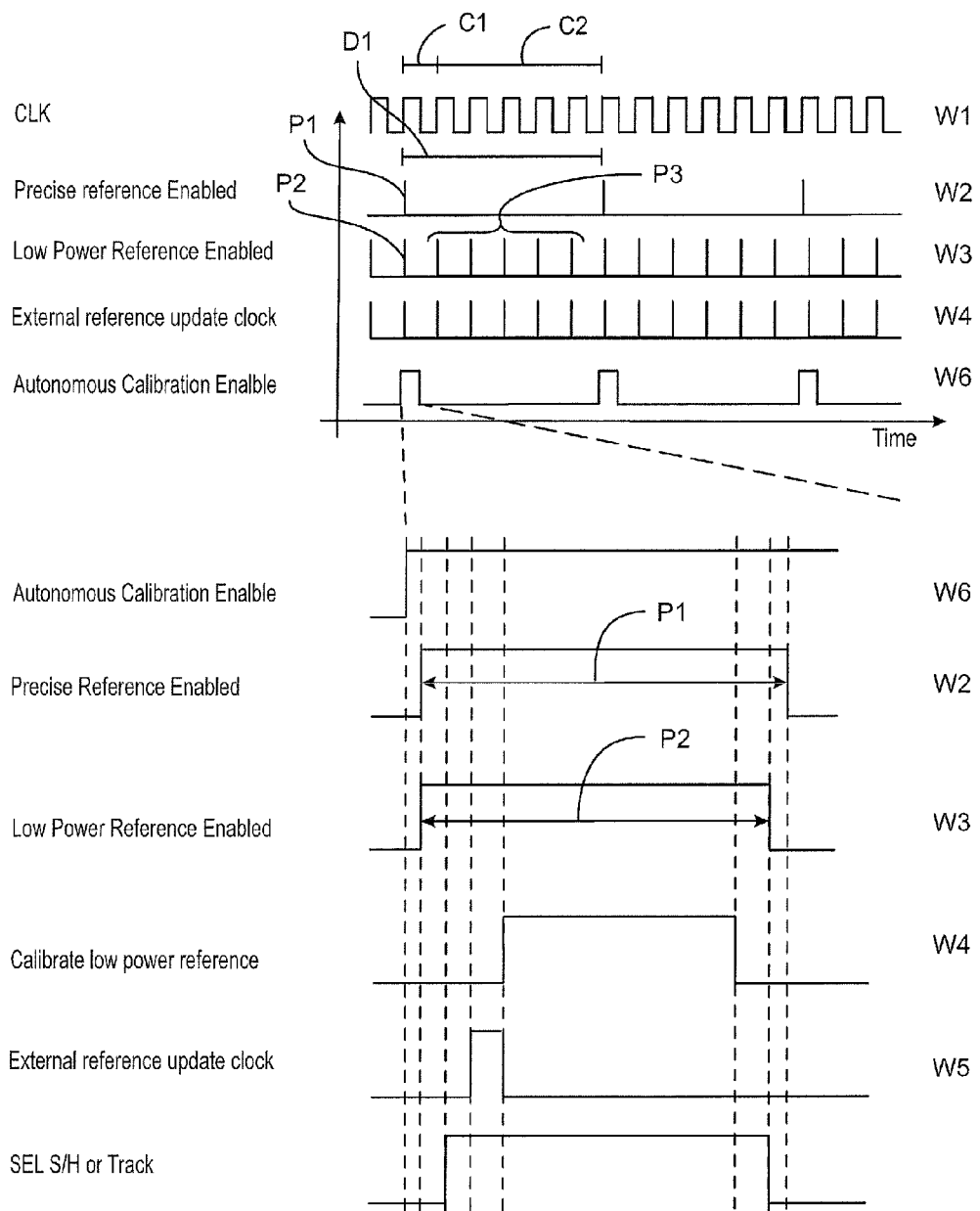
FIG. 4C is a timing diagram illustrating the operations of a sequencer of a low power reference device.

Turning now to FIG. 4B, a flow chart of one particular method for providing a low power reference signal is disclosed. More specifically, the steps S10-S80 shown may pertain to the operations of a reference device 10 executed during a power-save mode 36 for the duration of one sequence, or one predetermined segment of a given clock signal. In a first step S10, the reference device 10 or sequencer 26 may reference an oscillator or clock signal that is provided, for example, via an input terminal 12, or the like. Alternatively, the clock signal may be provided internally. The clock signal may be provided as a waveform W1 as shown in FIG. 4C. In a step S20, the sequencer 26 may designate one or more sequences, or more particularly, divide the clock signal W1 into equal portions, for instance, of duration D1. Each sequence of duration D1 may include a plurality of cycles C1, C2. More specifically, one sequence may include a primary cycle C1 and subsequent secondary cycles C2. In a step S30, the sequencer 26 may enable the precision reference module 18 of reference device 10 to generate a precise reference signal at a point during the primary cycle C1. For example, the waveform W2 of FIG. 4C illustrates the precise reference signal being enabled at a point P1 within the primary cycle C1 of a sequence. In a step S40, the sequencer 26 may operate the switches 28, 30 of the output module 24 to supply the precise reference signal to the output terminals 14 at a point during the primary cycle C1. In a step S50, the sequencer 26 may also generate a low power reference signal at a point P2 during the primary cycle C1, as shown by the waveform W3 of FIG. 4C. In a step S60, the sequencer 26 may engage the calibration module 22 to calibrate the low power reference signal so as to closely approximate the precise reference signal. The enabling calibration signal may be represented by waveform W4 as shown in FIG. 4C. Once the calibration step S60 is complete, the low power reference signal may be used for subsequent references. Accordingly, the sequencer 26 may disable the precision reference module 18 and any other non-vital components in a step S70 for the duration of the secondary cycles C2. In a step S80, the sequencer 26 may operate the switches 28, 30 of the output module to supply only the low power reference signal to the output terminals 14 at each point P3 for the duration of the secondary cycles C2. The sequencer 26 may further output a clock refresh reference signal via output terminal 16 of the reference device 10 at each clock cycle, as shown as waveform W5 of FIG. 4C. The clock refresh reference signal may provide other components of a particular device with information relating to when a final reference signal is updated. For example, the clock refresh reference signal may indicate the optimum time at which reference voltage and/or currents should be updated. Furthermore, the sequencer 26 may be configured to recalibrate the low power reference signal during the primary cycle C1 of each sequence as indicated by waveform W6 of FIG. 4C.

Figure 5A:
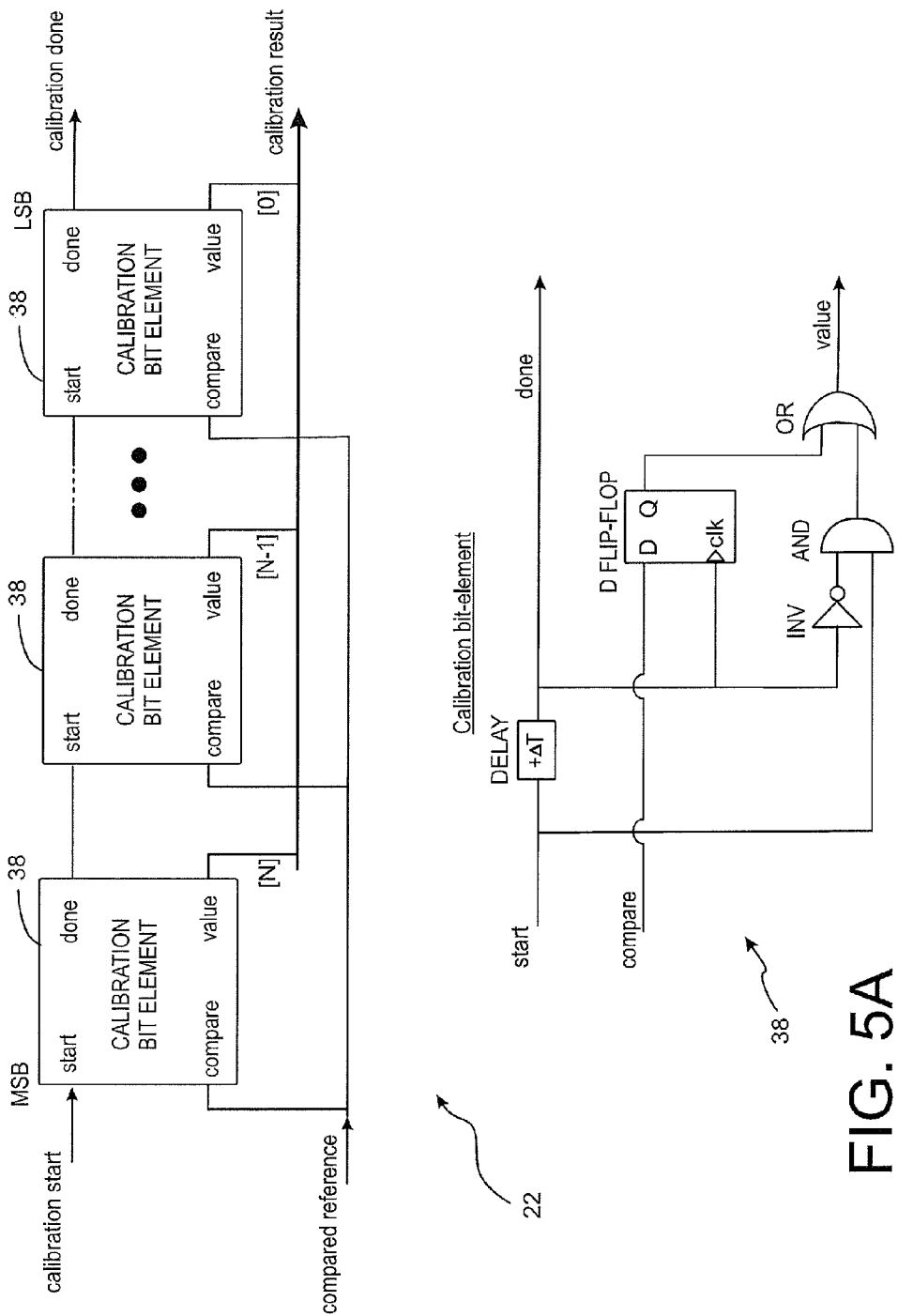
FIG. 5A is a schematic of a calibration module of a low power reference device.

Turning to FIG. 5A, a schematic of an exemplary calibration module 22 is disclosed. As previously shown, the calibration module 22 may be configured to compare and adjust a low power reference signal against a precise reference signal so as to approximate the precise reference signal. Furthermore, the calibration module 22 may be fully autonomous such that no external control or clocks are necessary to calibrate the low power reference signal against the precise reference signal. Comparisons and adjustments may be executed using binary coding of the respective values of the precise and low power reference signals. Accordingly, the calibration module 22 may include a plurality of calibration bit elements 38 arranged in series such that each bit element 38 corresponds to a bit belonging to a series of bits, or word. Each word may correspond to a value or magnitude of a low power reference signal to be calibrated. Moreover, the calibration bit elements 38 may be configured such that the leftmost bit element 38 corresponds to the most significant bit (MSB) of a particular value while the rightmost bit element 38 corresponds to the least significant bit (LSB) of the value.

Figure 5B:
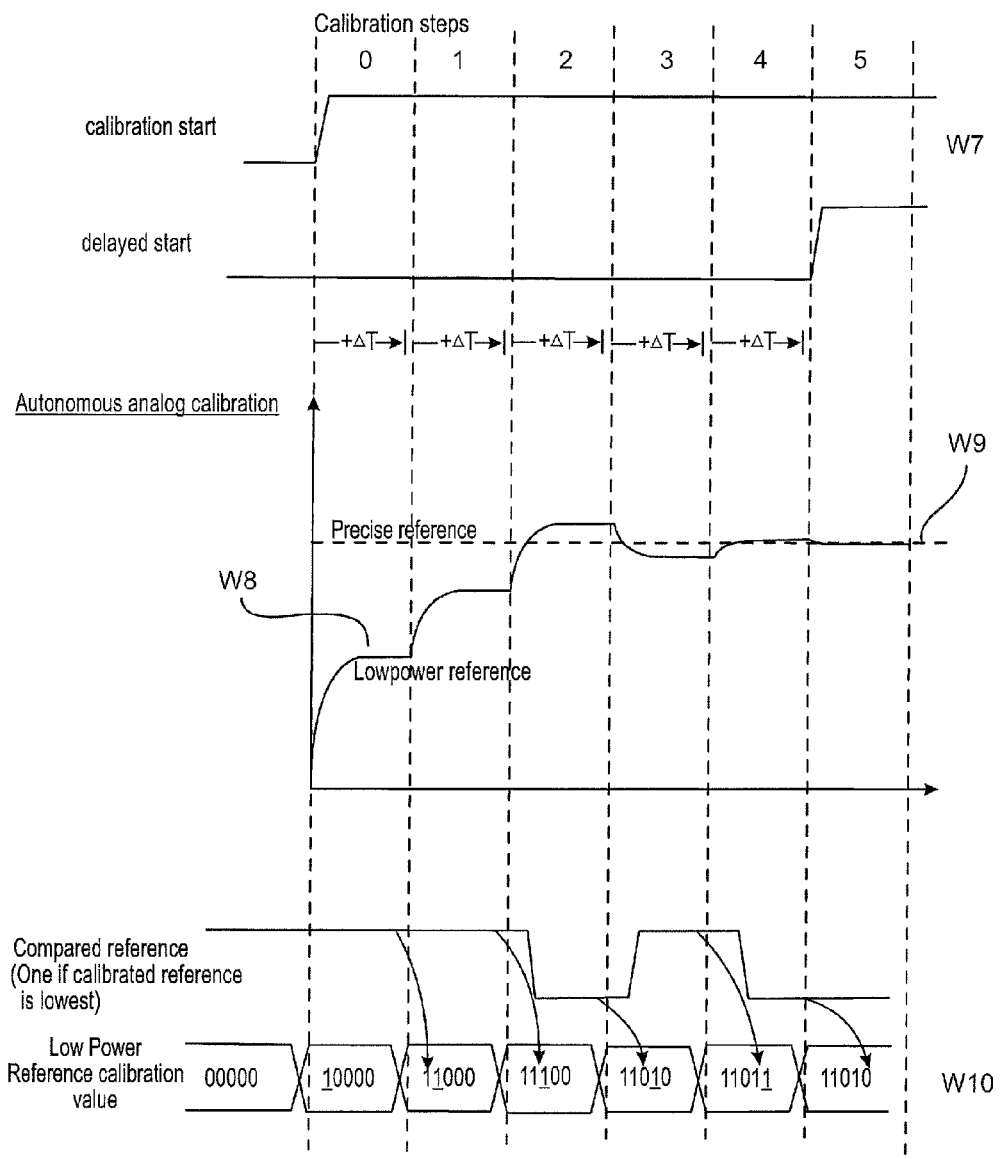
FIG. 5B is another timing diagram illustrating the operations of a calibration module of a low power reference device.

Beginning at the MSB, a positive edge of the calibration start signal W7 may be introduced at the leftmost bit element 38 of the calibration module 22, as further illustrated graphically in FIG. 5B. After a predefined delay, the calibration module 22 may be configured to assert and store a logical HIGH or "1" as the MSB of the calibrated result W10 if the low power reference signal W8 is less in value than the precise reference signal W9. Alternatively, if the low power reference signal W8 is greater in value than the precise reference signal W9, the corresponding bit element 38 may assert and store a logical LOW or "0" as the MSB of the calibrated result W10. Upon completion of one comparison, the calibration module 22 may proceed to compare the next MSB. The calibration module 22 may be configured to repeat in this fashion until the LSB as well as all intervening bits have been compared to output a calibrated low power reference signal W10 as shown in FIG. 5B.

INDUSTRIAL APPLICABILITY

In satisfaction of the above-identified needs, an improved reference module 10 for use with electronic devices is disclosed. Among other things, the reference module 10 combines autonomous operations and optimized sequence timing techniques to provide voltage and/or current references with uncompromised reliability at significantly lower power consumption rates. More specifically, the reference module 10 includes an autonomous calibration module 22 which briefly refers to a precise reference signal and closely approximates the precise reference signal using a low power reference module 20. The calibrated low power reference module 20 is then duty-cycled, sampled and stored as a reference signal for subsequent cycles until it is calibrated again by the autonomous calibration module 22. As the low power reference module 20 more than adequately defines a voltage and/or current reference, the precision reference module 18 as well as any other non-vital components may be disabled to save considerable power. As power consumption is considerably reduced, energy supplied by battery cells and similar energy sources are conserved.

While only certain embodiments have been set forth, alternatives and modifications will be apparent from the above description to those skilled in the art. These and other alternatives are considered equivalents and within the spirit and scope of this disclosure and the appended claims.

What is claimed:

1. A low power reference device, comprising:
one or more precision reference modules configured to output a first reference signal;
one or more low power reference modules configured to output a second reference signal approximating the first reference signal;
one or more calibration modules configured to receive the first and second reference signals and output one or more correction signals to the low power reference module;
one or more output modules configured to receive the first and second reference signals and output a final reference signal; and
one or more sequencers configured to operate the precision reference module, low power reference module, calibration module and output module.

2. The low power reference device of claim 1, wherein the one or more sequencers are configured to operate the precision reference module, low power reference module, calibration module and output module according to a predetermined timing sequence.

3. The low power reference device of claim 2, wherein the predetermined timing sequence includes one or more selectable modes.

4. The low power reference device of claim 3, wherein the modes include at least a default mode and a power-save mode.

5. The low power reference device of claim 4, wherein the precision reference module is always on during the default mode.

6. The low power reference device of claim 4, wherein the low power reference module is duty-cycled during the power-save mode.

7. The low power reference device of claim 4, wherein during the power-save mode, the one or more sequencers are configured to reference a clock signal, designate the clock signal into a plurality of repeating sequences such that each sequence includes a primary cycle that is followed by one or more secondary cycles, enable selection of only the first reference signal at the primary cycle, enable calibration of the second reference signal to approximate the first reference signal at the primary cycle, disable at least the first reference signal during the secondary cycles, and enable selection of only the second reference signal at the secondary cycles.

8. The low power reference device of claim 3, wherein the modes include a high accuracy mode and a low accuracy mode.

9. The low power reference device of claim 1, wherein the precision reference module includes a bandgap cell.

10. The low power reference device of claim 1, wherein the low power reference module includes a transconductance cell.

11. The low power reference device of claim 1, wherein the low power reference module is configured to adjust the second reference signal according to the correction signal to approximate the first reference signal.

12. The low power reference device of claim 1, wherein the low power reference module is configured to increase or decrease a magnitude of the second reference signal based on the correction signal received.

13. The low power reference device of claim 1, wherein the calibration module is integrated into the low power reference module.

14. The low power reference device of claim 1, wherein the calibration module includes a comparator configured to compare magnitudes of the first and second reference signals.

15. The low power reference device of claim 1, wherein the output module includes a first switch configured to select between the first and second reference signals, and a second switch configured to select between a sample and hold mode and a track mode.

16. The low power reference device of claim 1, wherein the predetermined timing sequence is configurable by a user.

17. The low power reference device of claim 1, wherein the one or more sequencers are further configured to output a clock refresh reference signal, the clock refresh reference signal including information related to final reference signal updates.

18. The low power reference device of claim 1, wherein each of the precision reference module, low power reference module, calibration module, output module and one or more sequencers are autonomous.

19. A method for generating a low power reference signal from a reference device operating in a power-save mode, comprising the steps of:

referencing a clock signal;
generating a precise reference signal;
generating a low power reference signal;
calibrating the low power reference signal to approximate the precise reference signal;
disabling at least the precise reference signal; and
selecting only the low power reference signal to be output from the reference device.

20. The method of claim 19 further comprising the step of designating the clock signal into a plurality of repeating sequences, each sequence having a primary cycle followed by one or more secondary cycles, wherein the precise reference signal is generated at the primary cycle and only the precise reference signal is selected to be output from the reference device at the primary cycle, wherein the low power reference signal is generated at the primary cycle, wherein the low power reference signal is calibrated at the primary cycle, wherein the precise reference signal is disabled during the secondary cycles, and wherein the low power reference signal is selected to be output at the secondary cycles.

21. The method of claim 19, wherein the precise reference signal is generated using a bandgap cell.

* * * * *